(12) United States Patent
Mital

(10) Patent No.: US 8,555,617 B2
(45) Date of Patent: *Oct. 15, 2013

(54) EXHAUST GAS TREATMENT SYSTEM INCLUDING A FOUR-WAY CATALYST AND UREA SCR CATALYST AND METHOD OF USING THE SAME

(75) Inventor: Rahul Mital, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 872 days.

This patent is subject to a terminal disclaimer.

(21) Appl. No.: 12/411,822

(22) Filed: Mar. 26, 2009

(65) Prior Publication Data

US 2010/0242448 A1    Sep. 30, 2010

(51) Int. Cl.
    *F01N 3/00*    (2006.01)
(52) U.S. Cl.
    USPC .................................. 60/295; 60/301; 60/297
(58) Field of Classification Search
    USPC ................... 60/286, 295, 301, 297, 303, 311
    See application file for complete search history.

(56) References Cited

U.S. PATENT DOCUMENTS

| | | | |
|---|---|---|---|
| 4,462,812 A | 7/1984 | Bly et al. | |
| 6,093,378 A | 7/2000 | Deeba | |
| 6,928,806 B2 | 8/2005 | Tennison et al. | |
| 7,005,116 B2 | 2/2006 | Schafer-Sindlinger et al. | |
| 7,832,203 B2* | 11/2010 | Chiffey et al. | 60/297 |
| 2004/0116276 A1 | 6/2004 | Yezerets et al. | |
| 2004/0237507 A1* | 12/2004 | Duvinage et al. | 60/276 |
| 2005/0241296 A1* | 11/2005 | McCabe et al. | 60/274 |
| 2006/0248874 A1 | 11/2006 | Goersmann et al. | |
| 2006/0260296 A1* | 11/2006 | Theis | 60/286 |
| 2006/0260297 A1* | 11/2006 | Koch | 60/286 |
| 2008/0022659 A1 | 1/2008 | Viola et al. | |
| 2008/0022662 A1* | 1/2008 | Yan | 60/286 |
| 2008/0066454 A1 | 3/2008 | Viola | |
| 2008/0066456 A1 | 3/2008 | Schmieg et al. | |
| 2008/0070778 A1 | 3/2008 | Castellano et al. | |
| 2008/0141662 A1 | 6/2008 | Schuster et al. | |
| 2008/0155972 A1* | 7/2008 | Driscoll et al. | 60/299 |
| 2008/0156569 A1 | 7/2008 | Clevenger et al. | |
| 2008/0256935 A1* | 10/2008 | Oger et al. | 60/299 |
| 2008/0271440 A1 | 11/2008 | Xu et al. | |
| 2008/0289321 A1 | 11/2008 | Lu | |
| 2009/0211231 A1 | 8/2009 | Yoshida et al. | |
| 2010/0236224 A1 | 9/2010 | Kumar et al. | |

* cited by examiner

FOREIGN PATENT DOCUMENTS

CN    1260735 A    7/2000
EP    1054722 B1    12/2001

OTHER PUBLICATIONS

A. Shoji, S. Kamoshita, T. Watanabe, T. Tanaka, and M. Yabe, "Development of a Simultaneous Reduction System of NOx and Particulate Matter for Light-Duty Truck", SAE Technical Paper Series 2004-01-0579, SAE International, 2004 SAE World Congress, Detroit, MI Mar. 8-11, 2004.

*Primary Examiner* — Thomas Denion
*Assistant Examiner* — Patrick Maines
(74) *Attorney, Agent, or Firm* — Cantor Colburn LLP

(57) ABSTRACT

The present invention is directed towards methods and systems for treatment of exhaust gas from an engine. In one embodiment, an exhaust gas treatment system for a diesel engine includes a four-way catalyst in fluid communication with a diesel engine to receive an exhaust gas flow therefrom, the four-way catalyst comprising a lean nitrogen oxides ($NO_X$) trap and a diesel particulate filter (DPF). The system also includes a urea selective catalytic reduction (U-SCR) catalyst in fluid communication with the four-way catalyst to receive the exhaust gas flow therefrom.

17 Claims, 4 Drawing Sheets

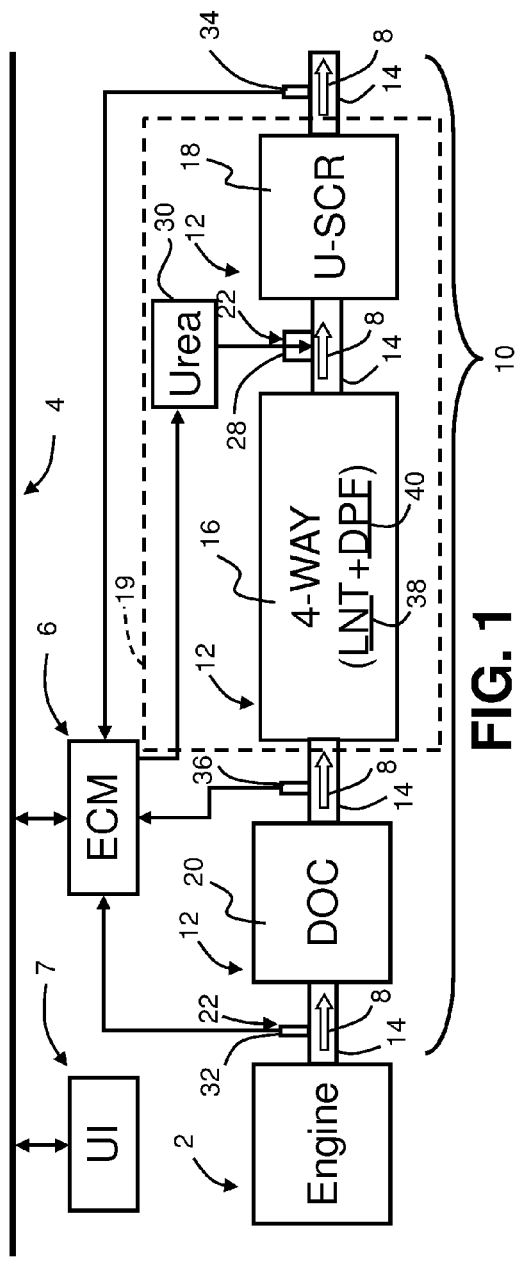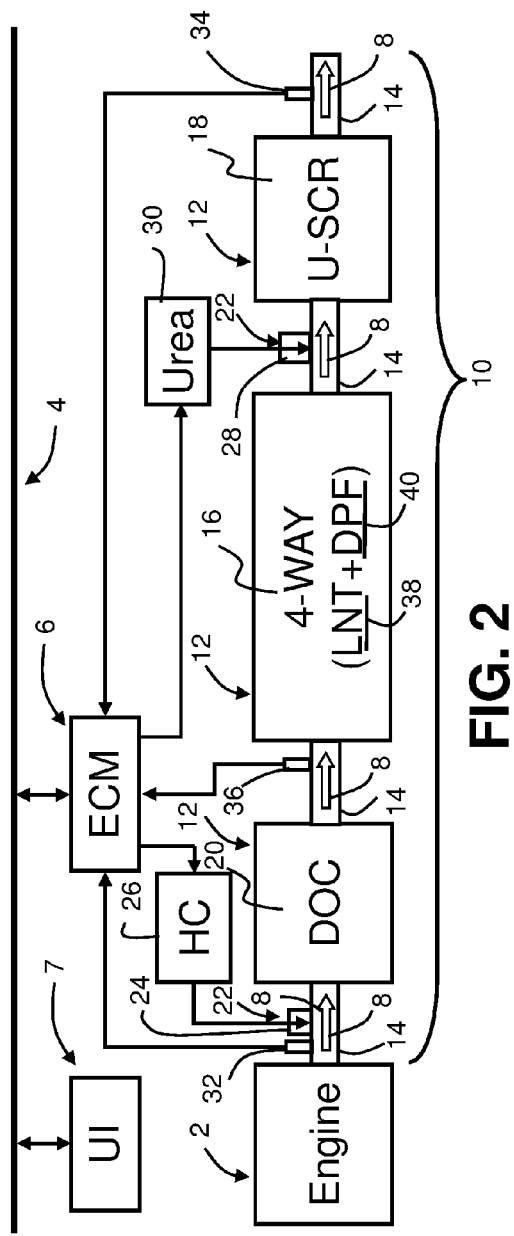

US 8,555,617 B2

EXHAUST GAS TREATMENT SYSTEM INCLUDING A FOUR-WAY CATALYST AND UREA SCR CATALYST AND METHOD OF USING THE SAME

FIELD OF THE INVENTION

Exemplary embodiments of the present invention are related to exhaust gas treatment systems, and, more specifically, to an exhaust gas treatment system for a diesel engine and a method of using the same.

BACKGROUND

Manufacturers of internal combustion engines develop engine operation control strategies to satisfy customer demands and meet various regulations for emission control and fuel economy. One such engine control strategy comprises operating an engine at an air/fuel ratio that is lean of stoichiometry to improve fuel economy and reduce greenhouse gas emissions. Such operation is possible using both compression-ignition (diesel) and spark-ignition engines. When an engine operates with lean (excess oxygen) air/fuel ratio, the resultant combustion temperature and excess oxygen leads to higher engine-out $NO_X$; however, commercial application of lean-operating engines is limited due to lack of effective methods to remove $NO_X$ from an exhaust gas flow under a lean exhaust conditions. Thus, efficient reduction of nitrogen oxides ($NO_X$=$NO$+$NO_2$) from lean-burn diesel and gasoline engine exhaust is important to meet future emission standards and improve vehicle fuel economy.

Reduction of $NO_X$ emissions from an exhaust feedstream containing excess oxygen is a challenge for vehicle manufacturers. By way of example, it is estimated that compliance with Bin 5 regulations in the United States may require an aftertreatment system capable of 70-90% $NO_X$ conversion efficiency on the FTP (Federal Test Procedure) cycle based on currently anticipated engine-out $NO_X$ levels. For practical application, the conversion efficiency must be obtained over a range of relatively low operating temperatures (e.g., 200-350° C.) occurring during the aforementioned FTP cycle and at a relatively higher range of operating temperatures (e.g., 450-550° C.) occurring during a high speed test cycle (e.g., US06 federal test procedure).

Various exhaust gas treatment systems have been proposed for vehicle applications under these lean-burn operating conditions. One approach combines a $NO_X$ storage reduction catalyst in series with a downstream diesel particulate $NO_X$ reduction system and a further downstream diesel oxidation catalyst. Targeted performance of 75-85% $NO_X$ reduction has been reported for such systems. However, such systems require periodic catalyst regeneration involving fuel injection to generate high exhaust gas temperatures and injection of reductants to regenerate the storage material of the catalyst. During periods of catalyst regeneration, maintaining the targeted $NO_X$ reduction levels during operation of the vehicle becomes problematic, since the components being regenerated will have greatly reduced $NO_X$ conversion capability.

Therefore, there is a need for effective exhaust gas treatment systems and methods of using the same to selectively reduce $NO_X$ in the exhaust gas flows of lean-burn internal combustion engines, particularly those used in various vehicular applications.

SUMMARY OF THE INVENTION

In one exemplary embodiment of the present invention, an exhaust gas treatment system for a diesel engine is provided. The system includes a four-way catalyst in fluid communication with a diesel engine to receive an exhaust gas flow therefrom, the four-way catalyst comprising a lean nitrogen oxides ($NO_X$) trap (LNT) and a diesel particulate filter (DPF). The system also includes a urea selective catalytic reduction (U-SCR) catalyst in fluid communication with the four-way catalyst to receive the exhaust gas flow therefrom.

In another exemplary embodiment of the present invention, a method of using an exhaust gas treatment system for a diesel engine is provided. The system includes a four-way catalyst in fluid communication with the diesel engine to receive an exhaust gas flow therefrom, the four-way catalyst comprising an LNT and a DPF; a U-SCR catalyst in fluid communication with the four-way catalyst to receive the exhaust gas flow therefrom; a first injection device that is configured to periodically and selectively inject a hydrocarbon, CO or $H_2$ material, or a combination thereof, into the exhaust gas flow between the LNT and the engine; a second injection device that is configured to periodically and selectively inject urea or ammonia, or a combination thereof, into the exhaust gas flow between the LNT trap and the U-SCR catalyst; and a controller that is configured to control operation of the engine and periodic and selective injection of the hydrocarbon, CO or $H_2$ material, or combination thereof, and periodic and selective injection of the urea or ammonia, or combination thereof, and determine an amount of $NO_X$ in the exhaust gas flow. The method includes operating the engine to produce the exhaust gas flow. The method also includes periodically and selectively injecting at least one of the hydrocarbon, CO or $H_2$ material, or combination thereof, or the urea or ammonia, or combination thereof, into the exhaust gas flow using the controller, wherein the exhaust gas flow from the engine has a first volume fraction of $NO_X$ ($NO_{X1}$) and the exhaust gas flow exiting the U-SCR catalyst has a predetermined second volume fraction of $NO_X$ ($NO_{X2}$) that is less than $NO_{X1}$.

In yet another exemplary embodiment of the present invention, a diesel engine and engine exhaust gas treatment system is provided. The invention includes a diesel engine. The exhaust gas treatment system includes a four-way catalyst in fluid communication with the diesel engine to receive an exhaust gas flow therefrom, the four-way catalyst comprising an LNT and a DPF. The system also includes a U-SCR catalyst in fluid communication with the four-way catalyst to receive the exhaust gas flow therefrom.

BRIEF DESCRIPTION OF THE DRAWINGS

Other features, advantages and details appear, by way of example only, in the following detailed description of embodiments, the detailed description referring to the drawing in which:

FIG. 1 is a schematic illustration of an exemplary embodiment of an exhaust gas treatment system as disclosed herein;

FIG. 2 is a schematic illustration of a second exemplary embodiment of an exhaust gas treatment system as disclosed herein;

Figure 3:
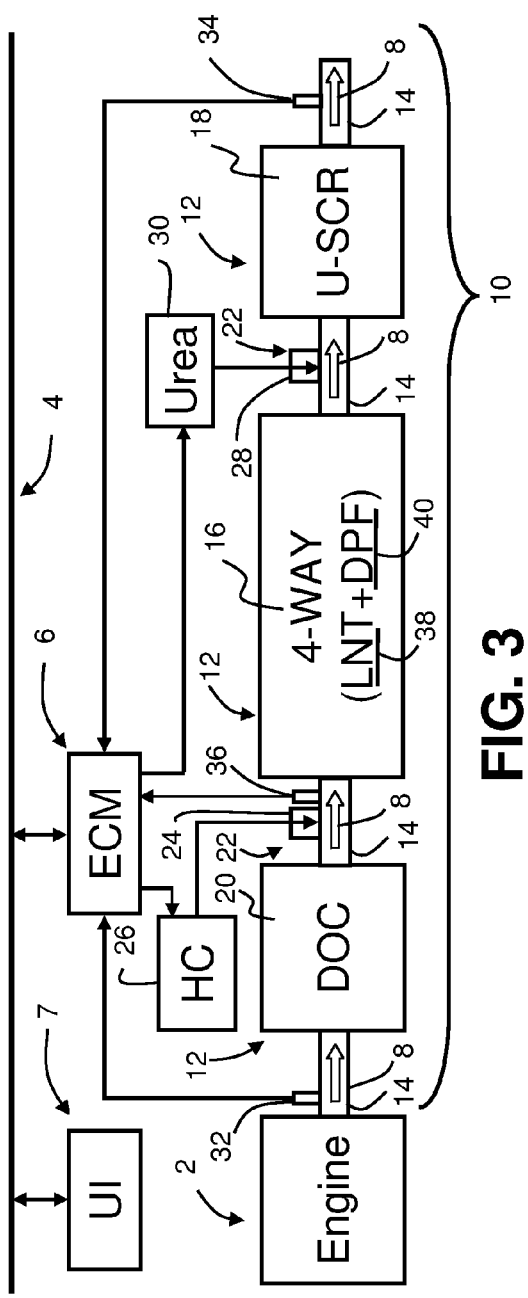
FIG. 3 is a schematic illustration of a third exemplary embodiment of an exhaust gas treatment system as disclosed herein.

The above features and advantages and other features and advantages of the present invention are readily apparent from the following detailed description of the best modes for carrying out the invention when taken in connection with the accompanying drawings.

DESCRIPTION OF THE EMBODIMENTS

In accordance with exemplary embodiments of the present invention, improved exhaust gas treatment systems and methods for treatment of exhaust gas emissions from diesel engines are provided. The present invention provides the potential for reduced and controlled exhaust emissions, including emissions of $NO_X$, CO, HC and diesel particulates, while improving overall packaging for the exhaust gas treatment system. The present invention also provides the potential for enhanced emission control strategies and methods, including strategies and methods, for example, that minimize the consumption of hydrocarbon (e.g., fuel) or urea needed to achieve reduced exhaust emissions, or that minimize the need for regeneration to remove accumulated sulfur compounds, and thereby extend the operating life of the exhaust system components. This is achieved through the use of advantageous combinations of exhaust system components or devices that are particularly suited for synergistic interaction with one another during operation of diesel engines to cause emission reduction, as well as implementation of control strategies and methods that make use of these advantageous combinations. In particular, in one configuration, reaction products of certain exhaust components (e.g., heat, ammonia, or otherwise) are utilized by exhaust treatment devices located downstream resulting in enhanced system efficiency of the exhaust gas treatment system by, for example, promoting enhanced $NO_X$ conversion and reduced urea consumption.

In general, referring to the configuration shown in FIG. 1, a schematic diagram depicts an embodiment of an internal combustion diesel engine 2, control system 4, and engine exhaust gas treatment system 10, in accordance with the present invention. The exemplary diesel engine 2 and control system 4 comprises a four-cycle internal combustion diesel engine 2 and electronic engine control module (ECM) 6 that may be configured to accomplish control within exhaust gas flow 8 in accordance with control methods and strategies described herein. The engine may include a known compression-ignition engine having an operating regime that is primarily lean of stoichiometry. Alternatively, diesel engine 2 may include an engine configured to employ any one of a number of engine configurations and associated engine control strategies, and which also include those having an operational regime (or regimes) that is lean of stoichiometry, e.g., homogeneous-charge compression-ignition engines. Diesel engine 2 includes a plurality of reciprocating pistons (not shown) attached to a crankshaft (not shown), which may be operably attached to a driveline, such as a vehicle driveline (not shown), to deliver tractive torque to the driveline. Diesel engine 2 may be any diesel engine configuration or application, including various vehicular applications (e.g., automotive, marine and the like), as well as various non-vehicular applications (e.g., pumps, generators and the like). During operation, diesel engine 2 generates an exhaust gas feed-stream or flow represented by arrows 8 containing regulated and unregulated emission constituents, generally including constituent gases and particulate matter. Exhaust gas treatment system 10 acts to convert regulated constituents, such as, for example, various hydrocarbons (HC), carbon monoxide (CO), nitrides of oxygen ($NO_X$) and particulate matter (PM), to unregulated constituents, such as, for example, carbon dioxide ($CO_2$), nitrogen ($N_2$) and water ($H_2O$).

Exhaust gas treatment system 10 comprises an integrated system intended to convert the regulated constituent elements of the exhaust gas flow 8 to unregulated constituents. Exhaust gas treatment system 10 is in fluid communication with diesel engine 2. As used herein, fluid communication refers to the passage of the exhaust gas flow 8 from one component 12 or device of the exhaust treatment system to another component 12 or device of the system, and may be established through any suitable fluid communication device, including an exhaust conduit, such as pipe 14, or an exhaust manifold (not shown) or a housing, such as a metal can, of an exhaust treatment component 12 or device, or combination thereof. Fluid communication may be from one device to another device, or from one device to a plurality of devices, or conversely from a plurality of devices to a single device, and includes communication from the engine to a device and final exhaust from a device to the external environment. Exhaust gas treatment system 10 includes a four-way catalyst 16 and an U-SCR in the form of a urea selective catalytic reduction (U-SCR) catalyst 18, each of which are configured to treat multiple emission constituents within the exhaust gas flow 8 produced by operation of diesel engine 2. The four-way catalyst 16 is configured for fluid communication with diesel engine 2 and is configured to receive the exhaust gas flow therefrom. Four-way catalyst 16 includes a lean nitrogen oxides ($NO_X$) trap (LNT) and a diesel particulate filter (DPF) as described herein. The U-SCR catalyst 18 is configured for fluid communication with the four-way catalyst 16 and is configured to receive the exhaust gas flow therefrom.

As shown in FIG. 1, exhaust gas treatment system 10 may also optionally include a diesel oxidation catalyst (DOC) 20. In the specific combination shown, the DOC 20 is located upstream from the four-way catalyst 16, which is further upstream from the U-SCR catalyst 18. As used herein, one component being located upstream with reference to another component in the context of the exhaust gas treatment system 10 means that it is relatively closer to engine 2.

Exhaust gas treatment system 10 may also include one or more dosing devices 22, such as a fluid injector, for dosing of reactant materials for interaction with the components 12 of the exhaust gas treatment system and treatment of the exhaust gas flow 8 as described herein. Referring to FIGS. 2-7, various embodiments of exhaust gas treatment system 10 include a hydrocarbon (HC) dosing device 24, such as a fuel injector, for injecting a controlled amount of an HC reductant from an HC source, such as HC reservoir 26, upstream of the four-way catalyst 16 as shown in FIGS. 2, and 4-7. As used herein, the term "HC reductant" may include a suitable hydrocarbon (HC), it may also include CO or $H_2$ material, or a combination thereof. For example, a hydrocarbon, such as diesel fuel, may be reformed over a suitable reformer catalyst to provide CO and $H_2$. Once reformed, the hydrocarbon, CO or $H_2$, or any combination thereof, may be injected into exhaust gas flow 8. Where a DOC 20 is used upstream of the four-way catalyst 16, the HC dosing device 24 may be located upstream of DOC 20 in order to consume oxygen in exhaust gas flow 8 via oxidation of the HC as it passes through DOC 20, including operation of the HC dosing device 24 to consume substantially all of the oxygen in exhaust gas flow 8. This would provide the fuel rich conditions in which four-way catalyst 16 can reduce the $NO_X$ to $N_2$. Oxidation of HC in DOC 20 would also provide exothermic conditions and generate heat to promote increased soot oxidation in four-way catalyst 16. Alternately, HC dosing device 24 may be located downstream of DOC 20 as shown in FIG. 3; however, embodiments having this configuration do not enjoy the benefit of oxidation of the HC in DOC 20. An example of a suitable HC reductant reservoir 26 would be a fuel tank or portion of a fuel conduit, including a high or low pressure portion of a fuel injection system, such as a common rail fuel injection system. The HC reductant dosing device 24 is operably connected to the ECM 6, which is adapted to control timing and quantity of HC reductant injection, typically in the form of engine fuel, to the exhaust gas flow 8. Alternatively, as illustrated in the embodiment of FIG. 1, unburned hydrocarbons from engine 2 (e.g., unburned fuel) may be used as an HC reductant material to reduce $NO_X$ in the four-way catalyst 16 and promote the other aspects described above using DOC 20, such as, for example, by using a post-injection control strategy.

Referring to FIGS. 1-7, various embodiments of exhaust treatment system 10 also include a urea dosing device 28, such as a urea injector, for injecting a controlled amount of urea or ammonia as a reductant from a urea reservoir 30 upstream of the U-SCR catalyst 18. As used herein, the term urea may also include the use of ammonia ($NH_3$) as a reductant, since the urea decomposes to produce ammonia as a reaction by-product, and it is the ammonia that is used as a reactant species in the catalytic reactions that occur in U-SCR 18. An example of a suitable urea reservoir would be a urea tank. The urea dosing device 28 is operably connected to the ECM 6, which is adapted to control timing and quantity of urea injection into the exhaust gas flow 8. When urea is used as the reductant, injection should occur sufficiently upstream from U-SCR catalyst 18 to enable the decomposition of the urea to ammonia prior to entry into U-SCR catalyst 18.

The exhaust gas treatment system 10 and control system 4 may include one or more sensing devices and systems that are configured for signal communication with ECM 6. Control system 4 may also include a user interface 7 (UI) for displaying system information to a user, including information obtained using any of the sensors described herein, as well as information associated with any of the operating methods or modes described herein. The sensing devices include a $NO_X$ sensor 32 operative to determine the amount of $NO_X$ in the exhaust gas flow 8 as it exits engine 2. The $NO_X$ sensor 32 preferably comprises a sensor operative to generate an electrical signal correlatable to a parametric value for $NO_X$ concentration in the exhaust gas feedstream, and further operative to generate a second electrical signal correlatable to a parametric value for air/fuel ratio of the exhaust gas feedstream, from which oxygen content can be determined. The $NO_X$ sensor 32 may be used in conjunction with control system 4 to affect control of engine 2 and exhaust gas treatment system 10.

The exhaust gas sensing devices also include exhaust gas sensing device 34. Exhaust gas sensing device 34 may include a second $NO_X$ sensor, operative to generate an electrical signal correlatable to a parametric value for $NO_X$ concentration in the exhaust gas feedstream 8. Alternatively, exhaust gas sensing device 34 may include a virtual sensing device, wherein $NO_X$ concentration in the exhaust gas feedstream is determined based upon engine operating conditions, which is a known technique. Exhaust gas sensing device 34 may be located downstream of the first $NO_X$ sensor 32, such as downstream of the U-SCR catalyst 18 so that the amount of $NO_X$ exiting exhaust treatment system 10 may be determined. Exhaust gas sensing device 34 may also be used in conjunction with control system 4 to affect control of engine 2 and exhaust gas treatment system 10.

The sensing devices may also include a temperature sensor 36 or a plurality of temperature sensors 36 (not shown), operative to measure the temperature of exhaust gas flow 8 within exhaust gas treatment system 10 for use in conjunction with control system 4 to affect control of engine 2 and exhaust gas treatment system 10. As an example, temperature sensor 36 may be located between the DOC catalyst 20 and four-way catalyst 16 to determine an operating temperature of the four-way catalyst 16. Similarly, a temperature sensor 36 may be located between the four-way catalyst 16 and the U-SCR catalyst 18 to determine an operating temperature of the U-SCR catalyst 18.

Referring to the exemplary embodiments of FIGS. 2-7, the DOC 20 is in fluid communication with the engine 12 and, with reference to the exhaust gas flow 8, is located upstream from the four-way catalyst 16 and is configured to oxidize certain constituents of the exhaust gas flow 8 to produce unregulated by-products or constituents that are adapted for further treatment in other components of exhaust treatment system 10, as described herein. Generally, the DOC 20 is a flow-through device that consists of a metal or ceramic monolith or substrate having a honeycomb-like structure that includes a plurality of generally parallel, longitudinally-extending, interconnected cells that provide a network comprising a plurality of flow channels for receiving exhaust gas flow 8 and are separated by a corresponding network of cell walls. The substrate has a large surface area along the cell walls. The cell walls have a washcoat that includes a porous ceramic matrix with a surface that is coated with a catalytically active amount of a platinum group metal catalyst. Suitable platinum group metals include Pt, Pd, Rh, Ru, Os or Ir, or a combination thereof. Of these, Pt or Pd, or combinations thereof, including alloys thereof, are particularly useful. As the exhaust gas flow 8 traverses the length of the DOC 20, particularly the flow channels and the washcoated cell walls, the platinum group metal catalyst catalyzes the oxidation of CO to $CO_2$, as well as catalyzing the oxidation of various hydrocarbons (HC), including gaseous hydrocarbons and liquid hydrocarbon particles, including unburned fuel or oil, or fuel or other HC reductants that are introduced into exhaust gas treatment system) to form $CO_2$ and $H_2O$, thereby reducing harmful emissions. In one configuration, during an advanced combustion operation of the engine, the control system 4 or ECM 6 may be used to cause combustion resulting in a higher level of HC in the exhaust gas flow 8 than is generated with stoichiometric air/fuel mixtures during normal combustion. The DOC 20 is configured to catalyze the decomposition of at least a portion of the increased amounts of HC in order to reduce, or alternately to prevent, the HC in the exhaust gas flow from reaching the U-SCR catalyst 18 and poisoning this device by reducing its ability to catalyze $NO_X$, or from reaching the external environment by release from the exhaust gas treatment system 10.

The DOC 20 may be configured to convert various regulated exhaust constituents to other regulated or unregulated exhaust constituents through oxidation. For example, the DOC 20 may be configured to oxidize hydrocarbons (HC) to carbon dioxide $CO_2$ and water ($H_2O$), convert carbon monoxide (CO) to carbon dioxide ($CO_2$) convert sulfur dioxide ($SO_2$) to sulfur trioxide ($SO_3$) and/or sulfuric acid ($H_2SO_4$) and convert nitrogen oxide (NO) to nitrogen dioxide ($NO_2$), or otherwise. Below are exemplary oxidation reactions contemplated with the DOC 20 of the present invention.

$$HC + O_2 = CO_2 + H_2O \qquad (1)$$

$$CO + \tfrac{1}{2}O_2 = CO_2 \qquad (2)$$

$$2SO_2 + O_2 = 2SO_3 \qquad (3)$$

$$SO_3 + H_2O = H_2SO_4 \qquad (4)$$

$$NO + \tfrac{1}{2}O_2 = NO_2 \qquad (5)$$

It should be appreciated that the DOC 20 may be configured to perform any one of the above conversions, combinations of the above conversions, or even all of the above conversions, depending on the reactant compounds and their concentrations found in the exhaust gas flow 8, the temperature of DOC 20, and the platinum group metals selected as the catalyst. Other oxidations are contemplated as well, such as oxidation of aldehydes, polycyclic aromatic hydrocarbons or otherwise. Further, the reactions in DOC 20 may be used to reduce the odor of certain emission components.

DOC 20 is housed within a housing (not shown), including a metal housing, such as a metal can having an inlet opening and outlet opening, or otherwise, configured for providing support and directing fluid flow to the DOC. The housing may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of DOC 20 to an exhaust pipe and/or another component of the exhaust gas treatment system 10. It should be appreciated that DOC 20, including the housing, may include one or more additional components for facilitating in operation of DOC 20, or exhaust gas treatment system 10, or control system 4, including, but not limited to, various gas or temperature sensors, injectors (urea or fuel injectors) or otherwise. Such additional features may be particularly advantageous for monitoring characteristics of the exhaust gas, such as flow rate of certain emission components (e.g., particulate matter or otherwise), which may be particularly advantageous for determining the necessity of initiating a regeneration process of the four-way catalyst 16 or U-SCR catalyst 18.

In one particular configuration, DOC 20 is configured to oxidize nitrogen oxide within exhaust gas flow 8 to nitrogen dioxide. This is advantageous as this conversion assists with $NO_X$ conversion by enabling storage of the nitrogen dioxide and its subsequent reduction in the LNT 38 portion of four-way catalyst 16, since LNT 38 is configured to trap nitrogen dioxide and subsequently to reduce it to nitrogen when the proper conditions for this reduction exist within exhaust gas treatment system 10, which conditions can be affected using control system 4, including the ECM 6. Accordingly, placement of DOC 20 upstream from the four-way catalyst 16, between the engine and the four-way catalyst 16, is particularly advantageous. It is also particularly advantageous to locate DOC 20 proximate the engine, preferably as close to the engine as possible, in order to maintain an operating temperature within DOC 20 of at least about 356° F. (180° C.), and more preferably in the range of about 482° F. (250° C.) to about 842° F. (450° C.).

Figure 6:
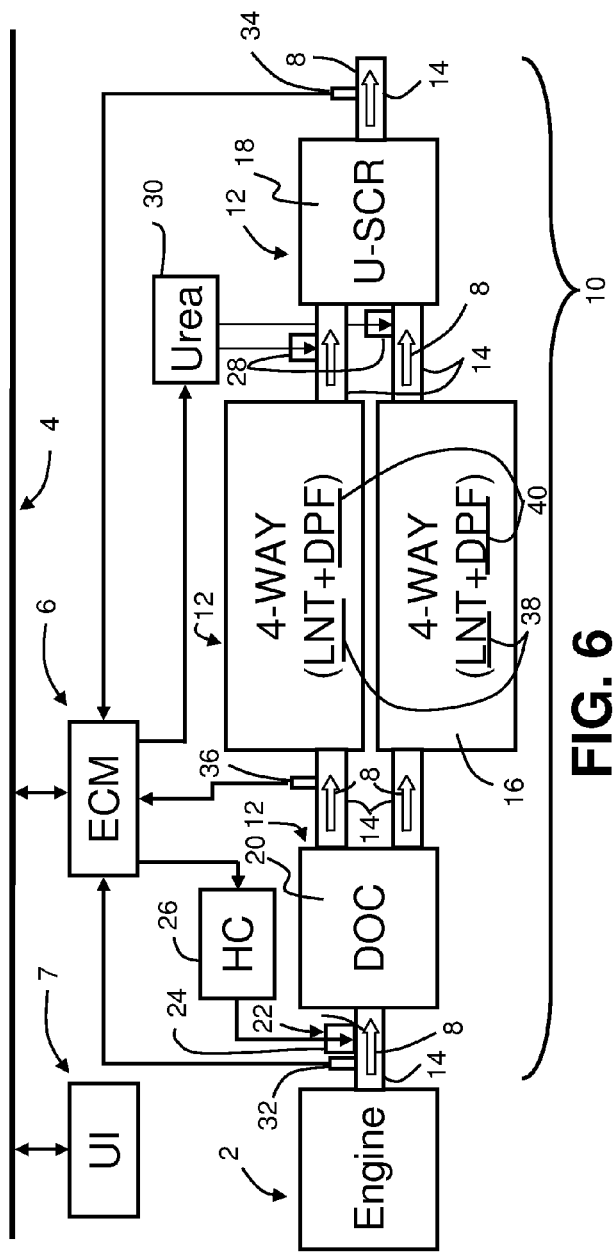
FIG. 6 is a schematic illustration of a sixth exemplary embodiment of an exhaust gas treatment system as disclosed herein.
Figure 7:
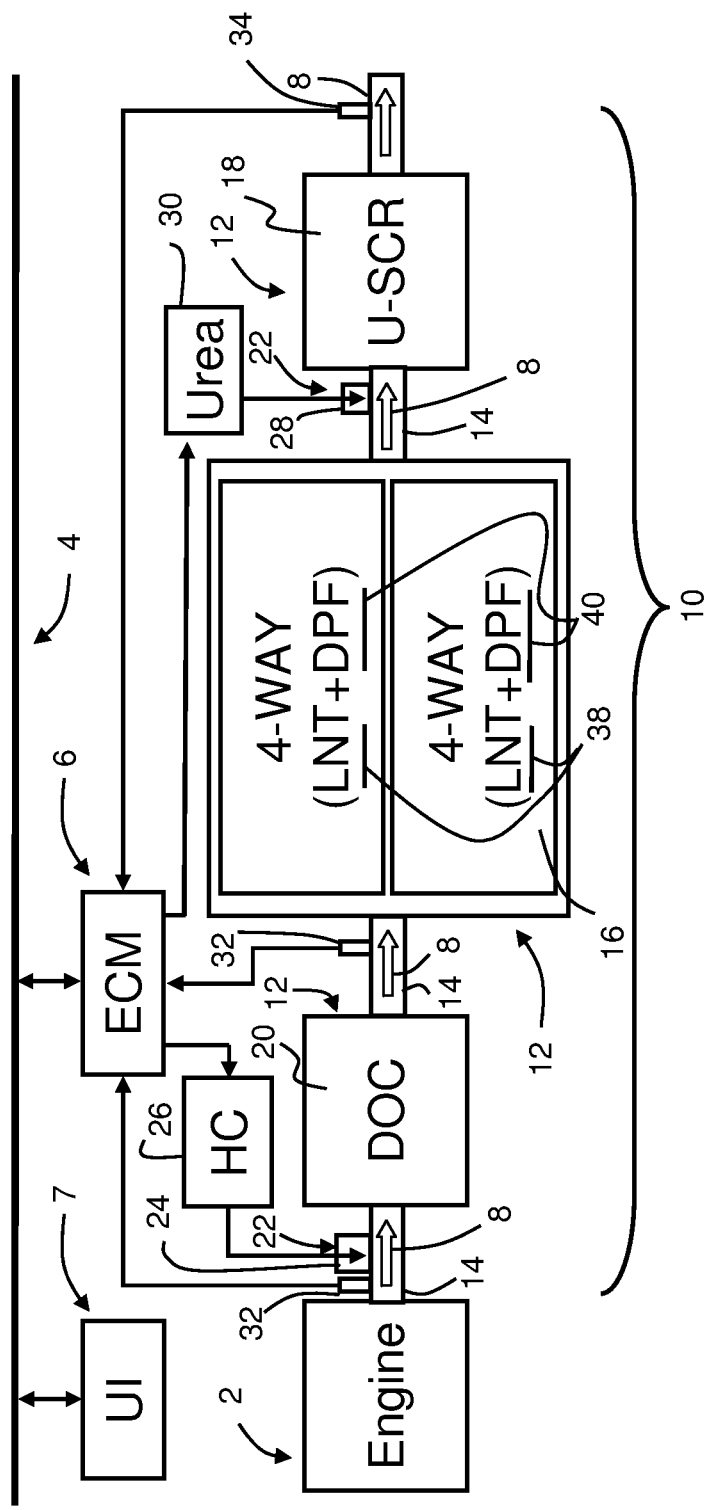
FIG. 7 is a schematic illustration of a seventh exemplary embodiment of an exhaust gas treatment system as disclosed herein.

As mentioned above, referring to FIGS. 1-7, the four-way catalyst 16 is located downstream (relatively farther from the engine and further along the exhaust gas flow path) from engine 2 and DOC 20 (FIGS. 2-7), between the DOC 20 and the U-SCR catalyst 18, and is configured to convert certain constituents of the exhaust gas flow 8 to produce unregulated by-products or regulated constituents that are adapted for further treatment in other components of exhaust treatment system 10, as described herein. The four-way catalyst 16 includes an LNT 38 and a DPF 40. The LNT 38 and the DPF 40 are combined on a ceramic wall-flow monolith. Referring to FIGS. 1-5, four-way catalyst 18 may include a single ceramic monolith. Alternately, as shown in FIGS. 6 and 7, four-way catalyst 18 may include a plurality of ceramic monoliths in a parallel configuration, such as, for example, to increase the volume of NOX that may be trapped and converted by four-way catalyst 18. A plurality of ceramic monoliths may be disposed in a corresponding plurality of housings as illustrated in FIG. 6, or may be disposed together in a single housing as illustrated in FIG. 7. As illustrated in phantom in FIG. 1, the LNT 38 and DPF 40 and the U-SCR catalyst 18 may alternately be housed together within a Single housing 19.

Generally, four-way catalyst 16 is a wall-flow-device that consists of a ceramic monolith or substrate having a honeycomb-like structure that includes a plurality of generally parallel, longitudinally-extending, interconnected cells that provide a network comprising a plurality of flow channels for exhaust gas flow 8 and are separated by a corresponding network of porous cell walls. The substrate has a large surface area along the cell walls. Alternating adjacent cells have one of the inlet or outlet plugged such that an alternating array of inlets is plugged with inlets of the immediately adjacent cells being open, and an alternating array of outlets is plugged with outlets of the immediately adjacent cells being open. The structure has open pores in the cell walls. Thus, the exhaust gas flow 8 passes into the plurality of inlets and is forced through the porous cell walls and into the adjacent outlet cells where it then flows out the plurality of unplugged outlets. The pores permit the gaseous constituents to pass through the cell walls while the PM is entrapped within the pores, thereby providing the PM filtering action of DPF 40. A washcoat is disposed on the ceramic wall-flow monolith, the washcoat includes an oxidation catalyst, an adsorbent and a reduction catalyst disposed on a ceramic matrix. The washcoat may be disposed along the cell walls of the plurality of inlet passages or the plurality of outlet passages or both. In one exemplary embodiment, the washcoat is disposed on the plurality of outlet passages. The washcoat includes a porous ceramic matrix with a surface that is coated with a catalytically active amount of an oxidation catalyst, an adsorbent and a reduction catalyst. In an exemplary embodiment, the oxidation catalyst may include Pt or Pd; the adsorbent may include an oxide or other compound of Ba, Ca, Sr, Mg, K, Na, Li, Cs, La or Y or a combination thereof; and the reduction catalyst may include Rh. The ceramic wall-flow monolith may be made from any suitable ceramic, including cordierite or alumina or the like. Use of four-way catalyst 16 is advantageous because of the space reduction achieved versus the use of a discreet LNT and DPF, as well as the reduction in the number of individual exhaust components.

The adsorbent is the $NO_X$ storage material of LNT 38. The adsorbent is disposed on the washcoat and may also extend into the cell walls. Under conditions leaner than a stoichiometric air to fuel ratio, referred to as a lean condition, $NO_X$ is oxidized on the oxidation catalyst and stored by adsorption on the adsorbent, primarily in the form of a nitrate. During lean-burn conditions, active oxygen discharged in the $NO_X$ storage process and excess oxygen in the exhaust gas also continuously oxidizes the PM. Then, when control system 4 provides conditions in exhaust gas treatment system 10 richer than a stoichiometric air to fuel ratio, referred to as a rich condition, either by controlling combustion in engine 2 or by direct dosing or injection of HC reductant into the exhaust gas treatment system 10 using HC dosing device 24, $NO_X$ is discharged from the $NO_X$ storage material. NO is reduced to nitrogen with HC and CO in the exhaust gas, while PM in DPF 40 is further oxidized with the active oxygen thus generated. While the four-way catalyst 16, including LNT 38 and DPF 40, is adapted to provide adsorption of $NO_X$ (LNT 38) and collection of PM (DPF 40) over the entire operating temperature range of exhaust gas treatment system 10 and engine 2, including typical ambient vehicle storage/starting temperatures of from about −40° F. (about −40° C.) to about 120° F. (about 49° C.) to operating temperatures up to about 1292° F. (about 700° C.). Generally, catalytic decomposition of $NO_X$ in the LNT 38 of four-way catalyst 16 begins to occur at an operating temperature of 356° F. (180° C.), with a more preferred operating temperature for $NO_X$ decomposition in four-way catalyst 16 being at least about 392° F. (200° C.), and even more preferably an operating temperature range of the four-way catalyst of about 482° F. (250° C.) to about 842° F. (450° C.). The DPF 40 of four-way catalyst 16 filters soot over the entire operating temperature range of engine 2, including typical ambient vehicle storage/starting temperatures from about −40° F. (about −40° C.) to about 120° F.(about 49° C.) to operating temperatures up to about 1292° F. (about 700° C.). Passive regeneration of DPF 40 and oxidation of the soot particles occurs in the presence of $NO_X$ over the temperature range of 482° F. (250° C.) to about 842° F. (450° C.), whereas active regeneration and oxidation of the soot particles occurs in the presence of $O_2$ at temperatures of about 500° C. or more, and more preferably over the temperature range of about 1112° F. (600° C.) to about 1202° F. (650° C.).

$NO_X$ adsorber systems such as LNT 38 are derived from a conventional three-way catalyst that additionally incorporates a $NO_X$ sorbent. The storage components in $NO_X$ adsorbers include alkaline earth elements and alkali metals, including Ba, Ca, Sr, Mg, K, Na, Li, Cs, La or Y, or combinations thereof generally as oxides or other compounds of these elements. The overall cycle of $NO_X$ adsorber operation may be described by the following five steps:

The first step is nitrogen monoxide oxidation to nitrogen dioxide:

$$NO + \tfrac{1}{2}O_2 = NO_2 \quad (6)$$

The second step is nitrogen oxides ($NO_2$ or NO) adsorption:

$$BaO + NO_2 + \tfrac{1}{2}O_2 = Ba(NO_3) \quad (7)$$

The conversion proceeds with reductant evolution. Once the exhaust gas flow 8 is switched to the rich condition, the excess of oxygen is replaced by reducing species, including hydrocarbons, carbon monoxide, and hydrogen. The third and fourth steps are $NO_X$ release from the nitrite or nitrate sites:

$$Ba(NO_3)_2 = BaO + 2NO + 1\tfrac{1}{2}O_2 \quad (8)$$

$$Ba(NO_3)_2 = BaO + 2NO_2 + \tfrac{1}{2}O_2 \quad (9)$$

The fifth step is $NO_X$ reduction to nitrogen, one of the possible reduction paths is:

$$NO + CO = \tfrac{1}{2}N_2 + CO_2 \quad (10)$$

During operation under rich conditions, the four-way catalyst 16 also advantageously produces ammonia. Some of the possible reaction steps include:

$$CH_4 + \tfrac{1}{2}O_2 \rightarrow CO + 2H_2 \quad (11)$$

$$CO + H_2O \rightarrow CO_2 + H_2 \quad (12)$$

$$NO + (5/2)H_2 \rightarrow NH_3 + H_2O \quad (13)$$

Figure 4:
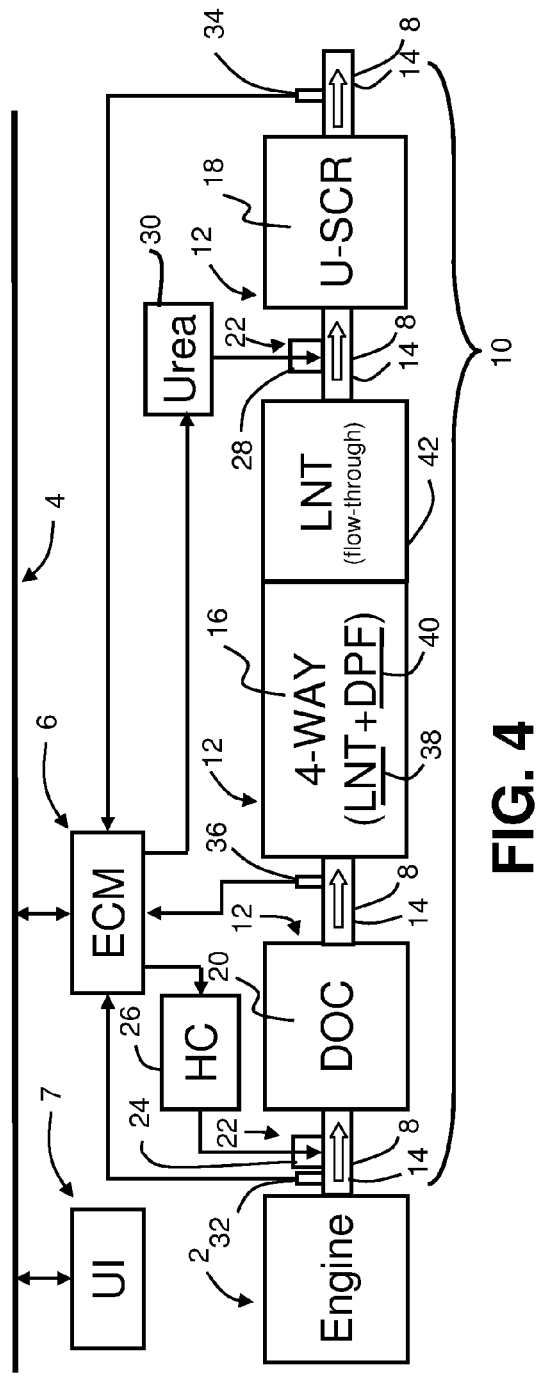
FIG. 4 is a schematic illustration of a fourth exemplary embodiment of an exhaust gas treatment system as disclosed herein.
Figure 5:
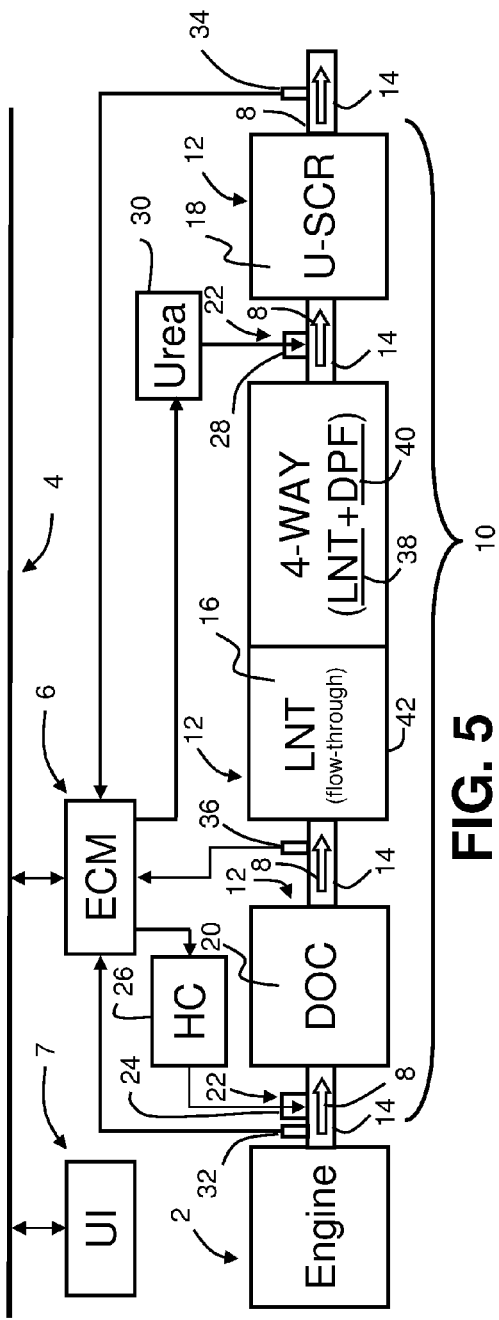
FIG. 5 is a schematic illustration of a fifth exemplary embodiment of an exhaust gas treatment system as disclosed herein.

As shown in FIGS. 4 and 5, exhaust gas treatment system 10 may also include a second lean $NO_X$ trap (LNT) 42 in order to increase the $NO_X$ adsorption capacity of the system. The second LNT 42 includes a washcoat disposed on a ceramic or metal flow-through monolith, such as the monolith described above for DOC 20. The flow-through monolith includes a washcoat that is disposed on the ceramic flow-through monolith. The washcoat includes an oxidation catalyst, an adsorbent and a reduction catalyst disposed on a ceramic matrix. The washcoat may be disposed along the cell walls of the plurality of passages that extend through the monolith. The washcoat includes a porous ceramic matrix with a surface that is coated with a catalytically active amount of an oxidation catalyst, an adsorbent and a reduction catalyst. In an exemplary embodiment, the oxidation catalyst may include Pt or Pd; the adsorbent may include an oxide or other compound of Ba, Ca, Sr, Mg, K, Na, Li, Cs, La or Y; and the reduction catalyst may include Rh. A ceramic wall-flow monolith may be made from any suitable high temperature ceramic, including alumina, cordierite or the like. The flow-through monolith of the second LNT 42 may be disposed to receive the exhaust gas flow 8 prior to (FIG. 5) or after (FIG. 4) the wall-flow monolith of the four-way catalyst 16. In the exemplary embodiment of FIG. 4, the flow-through monolith of the second LNT 42 is disposed to receive the exhaust gas flow 8 after the wall-flow monolith of the four-way catalyst 16.

Referring again to FIGS. 1-7, exhaust gas treatment system 10 also includes U-SCR catalyst 18 in fluid communication with the four-way catalyst 16 to receive the exhaust gas flow 8 therefrom. The U-SCR device 18 is configured to convert $NO_X$ in exhaust gas flow 8 to nitrogen and water. Similar to the DOC 20 and second LNT 42, the U-SCR catalyst 18 includes a flow-through ceramic monolith, such as a honeycomb-like structure or substrate, or otherwise. U-SCR catalyst 18 includes a ceramic monolith or substrate having a honeycomb-like structure that includes a plurality of generally parallel, longitudinally-extending, interconnected cells that provide a network comprising a plurality of flow channels for the exhaust gas flow that are separated by a corresponding network of cell walls. The substrate has a large surface area along the cell walls. The cell walls have a washcoat that includes a porous ceramic matrix with a surface that is coated with a catalytically active amount of a base metal catalyst, i.e., an amount sufficient to catalyze the desired chemical reactions. Suitable base metal catalysts include copper (Cu) or iron (Fe), or a combination thereof, including alloys and compounds thereof. The ceramic matrix may include any suitable porous ceramic. Suitable porous ceramics include various zeolites, such as those that comprise alumina, including various alumina silicates. The use of a base metal catalyst allows conversion of the nitrogen oxides without the use of precious metals. The U-SCR catalyst 18 utilizes ammonia to reduce $NO_X$. For example, in an exemplary embodiment, a dosing device 22, such as urea dosing device 28, is provided upstream from the U-SCR catalyst 18 for introducing urea to the exhaust gas flow 8 stream, such as through introduction of a urea solution. The urea is introduced upstream a sufficient distance from U-SCR catalyst 18 to permit the urea to decompose in the exhaust gas flow 8 to form ammonia prior to entering U-SCR catalyst 18. In one advantageous configuration, ammonia is also generated within the four-way catalyst 16 and travels downstream to the U-SCR catalyst 18. In this configuration, reduced amounts of urea are needed due to the ammonia generated in the four-way catalyst 16. Below are exemplary conversion chemical reactions contemplated with the U-SCR catalyst 18:

Urea decomposition:

$$CO(NH_2)_2 + H_2O \rightarrow 2NH_3 + CO_2 \qquad (14)$$

$NO_X$ reduction reactions in U-SCR catalyst 18:

$$6NO + 4NH_3 \rightarrow 5N_2 + 6H_2O \qquad (15)$$

$$4NO + 4NH_3 + O_2 \rightarrow 4N_2 + 6H_2O \qquad (16)$$

$$6NO_2 + 8NH_3 \rightarrow 7N_2 + 12H_2O \qquad (17)$$

$$2NO_2 + 4NH_3 + O_2 \rightarrow 3N_2 + 6H_2O \qquad (18)$$

$$NO + NO_2 + 2NH_3 \rightarrow 2N_2 + 3H_2O \qquad (19)$$

It should be appreciated that the U-SCR catalyst 18 may be configured to perform any one of the above conversions, or combinations of the above conversions, including all of the above conversions. The U-SCR catalyst 18 begins to function as described above at an operating temperature of at about 356° F. (180° C.), and may be more preferably operated in the range of about 482° F. (250° C.) to about 1022° F. (550° C.).

The U-SCR catalyst 18 is housed within a housing, such as a metal can, configured to provide support and direct the exhaust gas flow 8 into, through and out of U-SCR catalyst 18. The housing may have any suitable shape or size including a cylindrical shape. The housing may also include attachment features located proximate to an inlet opening, such as an inlet pipe, and an outlet opening, such as an outlet pipe, for fluid coupling of the U-SCR catalyst 18 to an exhaust pipe and/or other component of the exhaust gas treatment system 10. It should be appreciated that the U-SCR catalyst 18, including housing, may include one or more additional components for facilitating operation of the exhaust gas treatment system 10, including, but not limited to, sensors, dosing devices (urea or fuel injectors) or otherwise. Such additional features may be particularly advantageous for monitoring characteristics of the exhaust gas, such as the amounts or flow rates of certain emission constituents, which are particularly advantageous for control of the exhaust gas treatment system 10, including regeneration of the U-SCR catalyst 18.

The ability to generate ammonia through the four-way catalyst 16 for use in the U-SCR catalyst 18 is a particularly advantageous aspect of exhaust gas treatment system 10. Another advantageous aspect of exhaust gas treatment system 10 is the ability of four-way catalyst 16 to generate heat that is transferred to U-SCR catalyst 18. Accordingly, the configurations illustrated herein have the ability to heat the exhaust gas flow 8 entering the U-SCR catalyst 18 to a temperature greater than the temperature of the exhaust gas entering the four-way catalyst 16. The addition of heat to U-SCR catalyst 18 improves its conversion efficiency. Hence, the placement of the four-way catalyst 16 upstream from the U-SCR catalyst 18 provides a more efficient configuration of exhaust gas treatment system 10.

The configurations shown in FIGS. 1-7 provide the ability to tune the exhaust gas treatment system 10 to achieve a particular $NO_X$ conversion efficiency. This may be achieved by the use of $NO_X$ sensors, temperature sensors, calibration software, control algorithms and a controller, such as ECM 6 or control system 4, or a combination thereof, together with the periodic and selective use of exhaust gas treatment system 10, including DOC 20, four-way catalyst 16 or U-SCR 18, or a combination thereof, to achieve a $NO_X$ conversion efficiency of 90% by volume of the exhaust gas or more. For example, if a nitrogen oxide conversion/reduction (e.g., $NO_X$ to $N_2$) efficiency of about 50% to 75% is desired, the LNT 38 can be utilized to achieve this efficiency, wherein any ammonia ($NH_3$) produced by the conversion can be used by the U-SCR catalyst 18 located downstream from the LNT 38, for further $NO_X$ conversion. In another example, if higher $NO_X$ reduction is desired (e.g. about 90% or more), the DOC 20 and LNT 38 can be used to convert/reduce nitrogen oxides by about 50% to 75% and a urea injector can be utilized to convert/reduce the remainder of the $NO_X$ through the U-SCR catalyst 18. This higher conversion percentage of $NO_X$, through the use of the U-SCR catalyst 18, is particularly advantageous over the life of the exhaust gas treatment system 10 to counteract the deteriorating effects of sulfur regenerations on the four-way catalyst 16 and the reduction in its conversion efficiency.

Exhaust gas treatment system 10 and the controller, such as ECM 6, control system 4, or a combination thereof, may be operated in various operational modes. In one exemplary embodiment, the controller is configured to operate in a first mode to minimize consumption of urea or ammonia, or a combination thereof, and minimize $NO_X$ conversion in U-SCR catalyst 18. In another exemplary embodiment, the controller is configured to operate in a second mode to minimize consumption of a hydrocarbon, CO or $H_2$ material, or combination thereof, and minimize $NO_X$ conversion in four-way catalyst 16. These modes can be implemented to minimize the consumption of the hydrocarbon, CO or $H_2$ material, or to minimize the consumption of urea or ammonia, or a combination thereof.

In an exemplary embodiment, the exhaust gas treatment system 10 is configured such that the exhaust gas flow 8 from the engine 2 has a first volume fraction of $NO_X$ ($NO_{X1}$) and the exhaust gas flow exiting the U-SCR catalyst 18 has a second volume fraction of $NO_X$ ($NO_{X2}$), wherein $NO_{X2} \leq 0.1\, NO_{X1}$. In other words, the system is configured for a conversion efficiency of $NO_X$ of at least 90%. In one configuration, using the four-way catalyst 16 and periodic and selective injection of a hydrocarbon, CO or $H_2$ material, or a combination thereof, into the exhaust gas flow 8 upstream of the four-way catalyst 16, the four-way catalyst 16 provides a volume fraction reduction of $NO_{X1}$ expressed as a third volume fraction of $NO_{X1}$ ($NO_{X3}$) in the exhaust gas flow exiting the four-way catalyst 16, where $0.10\,NO_{X1} \leq NO_{X3} \leq 0.70\,NO_{X1}$.

In another configuration, using the U-SCR catalyst 18 and periodic and selective injection of urea or ammonia, or a combination thereof, into the exhaust gas flow 8 upstream of the U-SCR catalyst 18, the U-SCR catalyst 18 provides a volume fraction reduction of $NO_{X1}$ expressed as a fourth volume fraction of $NO_{X1}$ ($NO_{X4}$) in the exhaust gas flow exiting the U-SCR catalyst 18, where $0.05\,NO_{X1} \leq NO_{X4} \leq 0.60\,NO_{X1}$.

The exhaust gas treatment system 10 further includes ECM 6 and control system 4 for controlling the function of one or more of the components of the exhaust gas treatment system 10. At a minimum, this may include regeneration of one or more of the components of the exhaust gas treatment system 10. Accordingly, it is contemplated that the controller may be in communication with one or more sensors, such as temperature sensors, particulate matter sensors, oxygen sensors or otherwise, for monitoring the condition of the exhaust gas treatment system 10. Such sensors may be located before, after or both before and after any of the components of the exhaust gas treatment system 10, e.g., DOC 20, four-way catalyst 16, U-SCR catalyst 18 or otherwise. Further, the controller may be in communication with one or more heat sources suitable for causing regeneration of the components of the exhaust gas treatment system 10.

It is also contemplated that the controller may be used to achieve a specific $NO_X$ reduction/conversion target that is within the reduction/conversion capability limits of the system 10. For example, based on a mandated emission requirement, the emission target, i.e., the $NO_X$ conversion requirement, may be fixed, e.g. 80%. The control system 4, including ECM 6, can determine $NO_{X1}$ using the first $NO_X$ sensor 32 and $NO_{X2}$ using exhaust gas sensor 34, such as a second $NO_X$ sensor, to determine the current $NO_X$ reduction. If the value of $NO_{X2}$ reflects a sufficient reduction, no action is required. If it does not, control system 4 can be used to periodically inject urea through the urea injector or HC through the HC injector to achieve the target value of $NO_{X2}$. As noted above, the selection of the reductant, urea or HC, can, for example, be based on a tuning or control mode that is adapted to minimize usage of one or the other of these constituents. Control system 4 may also base the selection on required regeneration of one or the other of four-way catalyst 16 or U-SCR catalyst 18, wherein the selection of one device and its associated reductant is preferred while the other is undergoing regeneration.

The present invention offers the following features and advantages. First, embodiments that include DOC 20 will oxidize NO to $NO_2$ that will enhance the $NO_X$ storage and reduction using the LNT and increase the overall $NO_X$ conversion efficiency of the system. Secondly, the advanced combustion described herein will utilize high HC levels, either as a result of control of the combustion process to produce high engine out HC levels or as a result of direct injection of a hydrocarbon, CO or $H_2$, or combination thereof, into the exhaust gas flow 8. The high HC levels can be effectively oxidized in LNT 38, and in embodiments that include a DOC 20, in the combination of the DOC 20 and LNT 38, to minimize U-SCR catalyst 18 hydrocarbon poisoning and tailpipe HC emissions. Thirdly, a tunable $NO_X$ conversion efficiency can be achieved with this system. For example, if ~50-75% $NO_X$ conversion efficiency is desired, the LNT 38 can be used for $NO_X$ reduction. Any $NH_3$ produced during this process will be used by the U-SCR catalyst 18 downstream to further reduce $NO_X$ and enhance the conversion efficiency of the system 10. Fourthly, if a higher (i.e., greater than about 50 to about 75%) $NO_X$ conversion efficiency is desired, the limited capability of the combined DOC 20/LNT 38 may be used to achieve an additional ~10-15% $NO_X$ reduction and any additional $NO_X$ conversion that is needed can be achieved using the U-SCR catalyst 18 by injection of urea. Fifthly, utilizing this approach, a mode of operation of the exhaust treatment system that seeks to maximize the $NO_X$ conversion of the LNT 38 (and DOC 20 in embodiments where it is employed) can be used to reduce urea consumption, and more particularly to minimize the consumption of urea and thereby increase urea refill intervals. Sixthly, even when operated as described above using a mode where the LNT 38 is used for much of the $NO_X$ conversion, or even most of the $NO_X$ conversion, the durability of the LNT 38 can be improved because the system can periodically and automatically be switched to reduce the reliance on the LNT 38 by use of the U-SCR catalyst 18 to balance the $NO_X$ conversion load, so that the LNT 38 is not used all the time or is not required to operate at its highest $NO_X$ conversion efficiency. Balancing of the $NO_X$ conversion load between the LNT 38 and the U-SCR catalyst 18 can also be utilized to reduce the sulfur regeneration cycles required for the LNT 38. Seventhly, with the U-SCR catalyst 18 downstream of the LNT, $NO_X$ reduction at low exhaust gas temperatures can be achieved using the LNT 38, and in embodiments that employ a DOC 20, both the DOC 20 and LNT 38 can contribute to the NO to $NO_2$ oxidation when the U-SCR catalyst 18 is providing the primary $NO_X$ reduction. Eighthly, during regeneration of the DPF 40 and oxidation of the entrapped soot, the exhaust temperatures will be too high for effective LNT 38 operation, but $NO_X$ reduction via urea injection is still possible, thus allowing $NO_X$ control improvements during the DPF 40 regeneration cycle. Ninthly, under high engine speed and load conditions, the high temperature of the exhaust gas flow 8 with associated high levels of $NO_X$ may exceed the capacity of the LNT 38 (or DOC 20 and LNT 38) to achieve the desired $NO_X$ conversion efficiency. Under such conditions, high $NO_X$ conversion efficiency and control using the U-SCR catalyst 18 and urea injection will still be possible.

While exemplary embodiments have been described and shown, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An exhaust gas treatment system for a diesel engine, comprising:
    a diesel oxidation catalyst (DOC) in fluid communication with the diesel engine to receive an exhaust gas flow therefrom, the DOC disposed in a DOC housing;
    a hydrocarbon injection device located between the engine and the DOC that is configured to inject a hydrocarbon, CO, or $H_2$ material, or combination thereof, into the exhaust gas flow;
    a four-way catalyst in fluid communication with the DOC to receive the exhaust gas flow therefrom, the four-way catalyst comprising a lean nitrogen oxides ($NO_X$) trap and a diesel particulate filter (DPF); and
    a urea selective catalytic reduction (U-SCR) catalyst in fluid communication with the four-way catalyst to receive the exhaust gas flow therefrom;
    a second injection device that is configured to inject urea or ammonia, or a combination thereof, into the exhaust gas flow between the four-way catalyst and the U-SCR; and
    a controller that is configured to control operation of the exhaust gas aftertreatment system and periodic and selective injection of the hydrocarbon, CO or $H_2$ material, or combination thereof, using the hydrocarbon injection device, and periodic and selective injection of the urea or ammonia, or combination thereof using the second injection device, and determine an amount of $NO_X$ in the exhaust gas flow, the controller configured to selectively operate in a first mode to minimize consumption of the urea or ammonia, or a combination thereof, and minimize $NO_X$ conversion in the U-SCR catalyst or in a second mode to minimize consumption of the hydrocarbon, CO or $H_2$ material, or combination thereof, and minimize $NO_X$ conversion in the four-way catalyst.

2. The exhaust gas treatment system of claim 1, wherein the four-way catalyst comprises a ceramic wall-flow monolith.

3. The exhaust gas treatment system of claim 2, wherein the lean $NO_X$ trap comprises a washcoat disposed on the ceramic wall-flow monolith, the washcoat comprising an oxidation catalyst, an adsorbent and a reduction catalyst disposed on a ceramic matrix.

4. The exhaust gas treatment system of claim 3, wherein the oxidation catalyst comprises Pt or Pd; the adsorbent comprises an oxide or other compound of Ba, Ca, Sr, Mg, K, Na, Li, Cs, La or Y; the reduction catalyst comprises Rh and the ceramic matrix comprises alumina.

5. The exhaust gas treatment system of claim 2, further comprising a second lean $NO_X$ trap, the second lean $NO_X$ trap comprising a washcoat disposed on a ceramic or metal flow-through monolith.

6. The exhaust gas treatment system of claim 5, wherein the flow-through monolith is disposed to receive the exhaust gas flow prior to or after the wall-flow monolith.

7. The exhaust gas treatment system of claim 5, wherein the flow-through monolith and wall-flow monolith are disposed in a single housing.

8. The exhaust gas treatment system of claim 1, wherein the four-way catalyst comprises a plurality of ceramic wall-flow monoliths.

9. The exhaust gas treatment system of claim 1, wherein the exhaust gas flow from the engine has a first volume fraction of $NO_X$ ($NO_{X1}$) and the exhaust gas flow exiting the U-SCR catalyst has a second volume fraction of $NO_X$ ($NO_{X2}$), and wherein $NO_{X2} \leq 0.1\ NO_{X1}$.

10. The exhaust gas treatment system of claim 1, wherein the four-way catalyst and U-SCR catalyst are housed together in a single housing.

11. A method of using an exhaust gas treatment system for a diesel engine comprising a diesel oxidation catalyst (DOC) in fluid communication with the diesel engine to receive an exhaust gas flow therefrom, the DOC disposed in a DOC housing; a hydrocarbon injection device located between the engine and the DOC that is configured to inject a hydrocarbon, CO, or $H_2$ material, or combination thereof, into the exhaust gas flow; a four-way catalyst in fluid communication with the DOC to receive the exhaust gas flow therefrom, the four-way catalyst comprising a lean nitrogen oxides ($NO_X$) trap and a diesel particulate filter (DPF); a urea selective catalytic reduction (U-SCR) catalyst in fluid communication with the four-way catalyst to receive the exhaust gas flow therefrom; a second injection device that is configured to inject urea or ammonia, or a combination thereof, into the exhaust gas flow between the four-way catalyst and the U-SCR; and a controller that is configured to control operation of the engine and periodic and selective dosing of the hydrocarbon, CO or $H_2$ material, or combination thereof, and periodic and selective dosing of the urea or ammonia, or combination thereof, and determine an amount of $NO_X$ in the exhaust gas flow; the method comprising:

configuring the controller to operate in a first mode to minimize consumption of the urea or ammonia, or a combination thereof, and minimize NOX conversion in the U-SCR catalyst or in a second mode to minimize consumption of the hydrocarbon, CO or H2 material, or combination thereof, and minimize NOX conversion in the four-way catalyst;

operating the engine to produce the exhaust gas flow, and periodically and selectively injecting at least one of the hydrocarbon, CO or $H_2$ material, or combination thereof, or the urea or ammonia, or combination thereof, into the exhaust gas flow using the controller to operate the exhaust gas treatment system in the first mode or the second mode.

12. The method of claim 11, wherein periodically and selectively injecting comprises injecting the hydrocarbon, CO or $H_2$ material, or combination thereof, into the exhaust gas flow, wherein the exhaust gas flow from the engine has a first volume fraction of $NO_X$ ($NO_{X1}$) and the exhaust gas flow exiting the four-way catalyst has a predetermined second volume fraction of $NO_X$ ($NO_{X2}$) and $NO_{X2} \leq 0.1\ NO_{X1}$, and wherein the four-way catalyst provides a volume fraction reduction of $NO_{X1}$ expressed as a third volume fraction of $NO_{X1}$ ($NO_{X3}$) in the exhaust gas flow exiting the four-way catalyst, where $0.10 NO_{X1} \leq NO_{X3} \leq 0.70 NO_{X1}$.

13. The method of claim 12, wherein periodically and selectively injecting comprises injecting the urea or ammonia, or a combination thereof, into the exhaust gas flow, and wherein the U-SCR catalyst provides a volume fraction reduction of $NO_{xi}$ expressed as a fourth volume fraction of $NO_{X1}$ ($NO_{X4}$) in the exhaust gas flow exiting the U-SCR catalyst, where $0.05 NO_{X1} \leq NO_{X4} \leq 0.60 NO_{X1}$.

14. The method of claim 13, wherein the controller is configured to operate in the second mode to minimize consumption of hydrocarbon, CO or $H_2$ material, or combination thereof, and minimize $NO_{X4}$.

15. The method of claim 12, wherein the controller is configured to control the exhaust gas flow from the engine, the first dosing device or the second dosing device, or a combination thereof, to produce a predetermined second volume fraction of $NO_{X2} \leq 0.10 NO_{X1}$.

16. The method of claim 12, wherein the controller is configured to operate in the first mode to minimize consumption of urea or ammonia, or a combination thereof, and minimize $NO_{X3}$.

17. An exhaust gas treatment system for a diesel engine, comprising:

a diesel engine;

a diesel oxidation catalyst (DOC) in fluid communication with the diesel engine to receive an exhaust gas flow therefrom, the DOC disposed in a DOC housing;

a hydrocarbon injection device located between the engine and the DOC that is configured to inject a hydrocarbon, CO, or $H_2$ material, or combination thereof, into the exhaust gas flow;

a four-way catalyst in fluid communication with the DOC to receive the exhaust gas flow therefrom, the four-way catalyst comprising a lean nitrogen oxides ($NO_X$) trap and a diesel particulate filter (DPF); and a urea selective catalytic reduction (U-SCR) catalyst in fluid communication with the four-way catalyst to receive the exhaust gas flow therefrom;

a second injection device that is configured to inject urea or ammonia, or a combination thereof, into the exhaust gas flow between the four-way catalyst and the U-SCR; and a controller that is configured to control operation of the exhaust gas aftertreatment system and periodic and selective injection of the hydrocarbon, CO or $H_2$ material, or combination thereof, using the hydrocarbon injection device, and periodic and selective injection of the urea or ammonia, or combination thereof using the second injection device, and determine an amount of $NO_X$ in the exhaust gas flow, the controller configured to selectively operate in a first mode to minimize consumption of the urea or ammonia, or a combination thereof, and minimize $NO_X$ conversion in the U-SCR catalyst or in a second mode to minimize consumption of the hydrocarbon, CO or H2 material, or combination thereof, and minimize $NO_X$ conversion in the four-way catalyst.

* * * * *